US00H002262H

(19) United States
(12) Statutory Invention Registration
Nechitailo

(10) Reg. No.: US H2262 H
(43) Published: Sep. 6, 2011

(54) PRE-COMPRESSED PENETRATOR TIP FOR PROJECTILE

(75) Inventor: Nicholas V. Nechitailo, King George, VA (US)

(73) Assignee: The United States of America as represented by the Secretary of the Navy, Washington, DC (US)

(21) Appl. No.: 12/291,047

(22) Filed: Sep. 11, 2009

(51) Int. Cl.
*F42B 30/02* (2006.01)

(52) U.S. Cl. ..... 102/517
(58) Field of Classification Search ..... 102/517, 102/510
See application file for complete search history.

(56) References Cited

U.S. PATENT DOCUMENTS 6,374,743 B1 * 4/2002 Hug et al. ..... 102/518
6,799,518 B1 * 10/2004 Williams ..... 102/513
7,380,503 B2 * 6/2008 Williams et al. ..... 102/518
H2230 H * 8/2009 Nechitailo ..... 102/517
2005/0034626 A1 * 2/2005 Sanborn ..... 102/510
2006/0144281 A1 * 7/2006 Williams et al. ..... 102/517

* cited by examiner

*Primary Examiner*—Daniel Pihulic
(74) *Attorney, Agent, or Firm*—Gerhard W. Thielman

(57) ABSTRACT

A penetrator instrument disposable in a projectile is provided for penetrating a target. The instrument includes a substantially cylindrical shell and a tip element. The shell includes a cavity at a fore end. The surface has an interior annular surface. The tip element is disposable into the cavity. The element has an exterior annular surface. The shell radially compresses the tip element along respective the interior and exterior annular surfaces that adjoin each other. The shell can optionally include an aft bore for mass balancing or containment of auxiliary materials. The element can be a ceramic or composed of reactive materials.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PRE-COMPRESSED PENETRATOR TIP FOR PROJECTILE

CROSS REFERENCE TO RELATED APPLICATION

The invention is a Continuation-in-Part, claims priority to and incorporates by reference in its entirety U.S. patent application Ser. No. 12/291,036 filed Jul. 7, 2009 titled "Pre-Compressed Penetrator Element for Projectile" and assigned Navy Case 99602, which is a Continuation-in-Part of U.S. patent application Ser. No. 11/645,262 filed Nov. 30, 2006 titled "Ceramic and Stacked Penetrator Against a Hardened Target" assigned Navy Case 96229 and issued as Statutory Invention Registration H002230.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to penetrator elements in a projectile for perforating a thick-wall target, and more particularly to ceramic penetrators under pre-compression to deepen a crater in the target.

A hardened target presents challenges for a projectile delivered from an aerial platform or artillery gun due to payload mass and other design restrictions. The transportable quantity of explosive charge in the warhead limits capacity to penetrate a deeply buried target protected by extensive material to absorb the kinetic energy from impact and chemical reaction of the projectile.

Further, premature initiation of energetic materials in the warhead may produce only superficial damage to the hardened target. Such penetration may be obviated by kinetic energy transfer from a projectile to the target. However, the hardened target may absorb such an impact without sufficient damage for disablement.

SUMMARY

Conventional projectile weapons yield disadvantages addressed by various exemplary embodiments of the present invention. In particular, a war-head instrument is provided for penetrating a target, the penetrator element being disposable in a projectile. The instrument includes a substantially cylindrical shell and a tip element.

The shell includes a cavity at a fore end. The surface has an interior annular surface. The tip element is disposable into the cavity. The element has an exterior annular surface. The shell radially compresses the tip element along respective the interior and exterior annular surfaces that adjoin each other. The shell can optionally include an aft bore for mass balancing or containment of auxiliary materials. Preferably, the element can be a ceramic or composed of reactive materials.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

Figure 1:
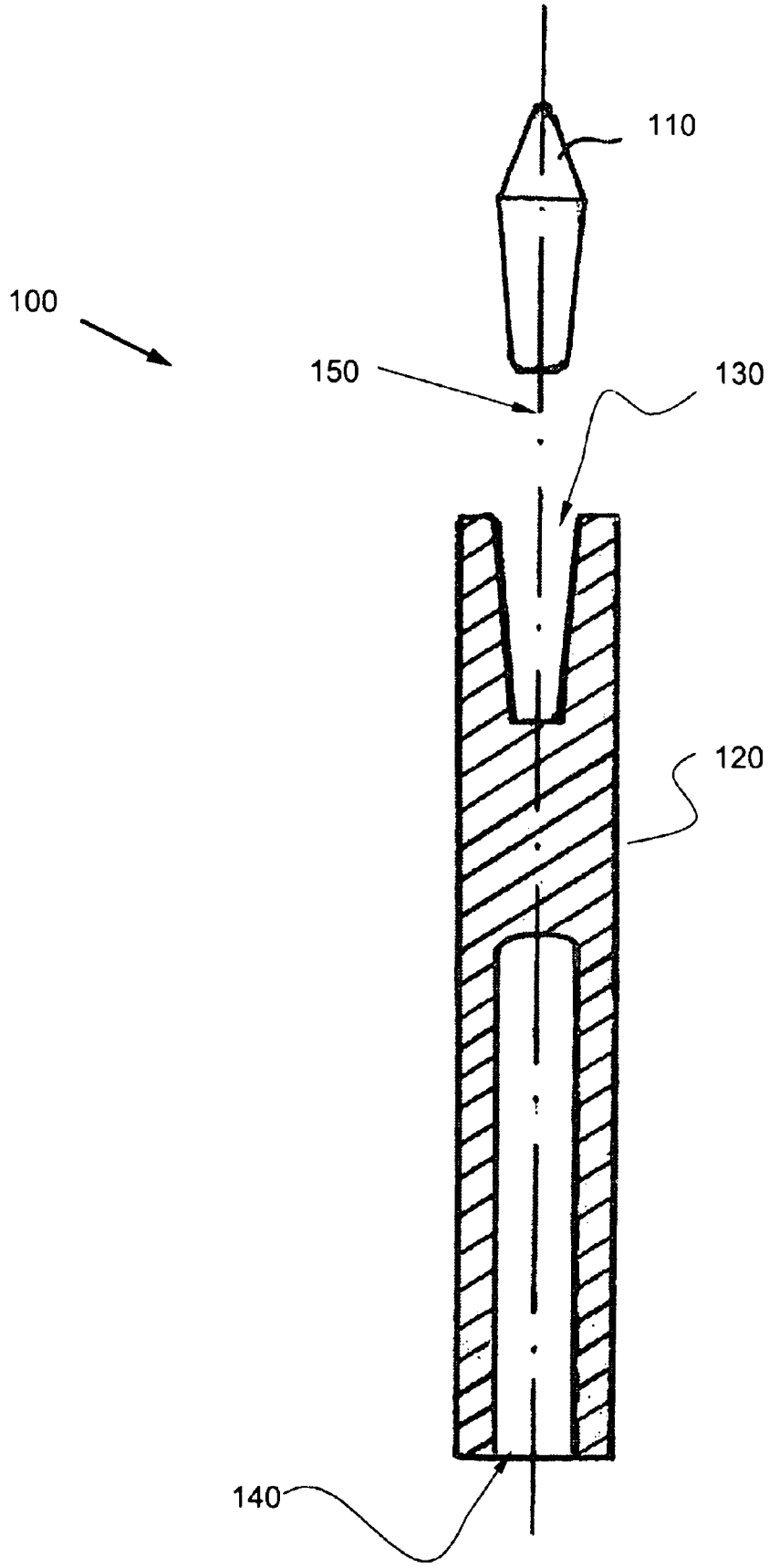
FIG. 1 is an elevation exploded view of an instrument for penetrating a target.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

A target-penetrating projectile may include a case or shell that contains a penetrator element intended to impact (i.e., mechanically collide against) a target, thereby transferring kinetic energy thereto to cause structural damage. The penetrator element may represent an impaction tip or sabot composed, for example, of ceramic. The projectile may include auxiliary or optional components, such as chemical propellants, explosive charge, guidance and control systems, etc. Under a sufficiently energetic collision the element can penetrate the target's outer casing. A projectile as pertaining to the exemplary embodiments refers to a warhead, such as on a ballistic shell, a missile or an unpowered bomb.

Various ceramic and ceramic-based composites are commercially available and several super-hard nano-composites are under development. Examples of ceramic materials include diamond, tungsten carbide, silicon carbide, aluminum oxide, beryllium oxide, magnesium oxide, and zirconium oxide. In preferred embodiments, ceramic materials have high Hugoniot elastic limit (HEL), commonly used to characterize material impact strength, as well as high mass density and low cost.

At the impact speeds typically above 2-3 km/s, these ceramic materials exhibit very high impact strength and thermal stability offering superior penetration properties over high-strength metals. Also, some launching methods, such as by railgun, provide for a more gradual acceleration of projectile as compared to explosive launch. More gradual acceleration of projectiles produce lower level of tensile waves traveling in the projectile materials and thus may produce less damage to brittle ceramic-type materials.

As example, tungsten carbide (WC, $W_2C$) ceramic is a high-density material with attractive compressive and tensile strength properties. Cercom, Inc., at 991 Park Center Dr, Vista Calif. 92081, manufactured hot-pressed tungsten carbide ceramic. The density and HEL of tungsten carbide varies between 15.53 and 15.56 g/cm$^3$ and 6.6±0.5 GPa, respectively. By comparison, one of the best commonly-used penetrating metal—tungsten alloy containing tungsten (W), nickel (Ni), and iron (Fe) in the ratio of 92.85:4.9:2.25 by weight has an HEL near 2.76±0.26 GPa. This tungsten alloy deforms plastically above its HEL, and its spall strength is determined as 1.9 GPa.

Alternatively, the penetrator element may be composed of compatible reactive materials that are chemically inert at standard pressure and temperature, but exothermally react under shock. Reactive materials generally include particles or powdered forms of one or more reactive metals, one or more oxidizers, and typically some binder materials.

The reactive metals may include aluminium (Al), beryllium (Be), hafnium (Hf), lithium (Li), magnesium (Mg), thorium (Th), titanium (Ti), uranium (U) and zirconium (Zr), as well as combinations, alloys and hydrides thereof. The oxidizers may include chlorates, such as ammonium perchlorate ($NH_4ClO_4$), lithium perchlorate ($LiClO_4$), magnesium perchlorate ($Mg(ClO_4)_2$), potassium perchlorate ($KClO_4$), peroxides, and combinations thereof. The binder materials typically include epoxy resins and polymeric materials. Commonly used materials that may release pressurized gaseous products upon impact include aluminium (Al)—Teflon (Polytetrafluorethylene or PTFE), hafnium (Hf)—fluoropolymer (e.g., THV500) reactive materials as well as a number of aluminium alloys.

An unsupported ceramic or reactive penetrator element may disintegrate upon contact with the target from sudden non-isotropic compressive load, reflected from the penetrators free boundary surfaces as tensile waves. Many reactive and ceramic materials exhibit high strength under compression but low strength under tensile waves. Pre-compression enables better utilization of strength properties of these non-metal materials and thereby minimizes intensity of tensile wave that causes spall.

FIG. 1 shows an elevation exploded view 100 of an exemplary embodiment of a ceramic penetrator. A ceramic pellet 110, representing the penetration instrument, presents a double-conical tip intended to penetrate a target upon physical contact. A metal sleeve or jacket 120, having a forward cavity 130 to contain the pellet 110 and an aft cavity 140 for shifting forward the projectile's center-of-mass distribution, or alternatively for inserting propellant or electronics.

The pellet 110 inserts into the forward cavity 130 along the projectile's centerline 150 to provide predominantly hoop compression, thereby enabling the pellet 110 to sufficiently maintain structural integrity for penetrating through a target. The pellet 110 can exhibit axi-symmetric shapes other than double-conical, such as cylindrical, spherical, ogive, etc. The pellet 110 and jacket 120 can be physically secured by mechanical clamps and/or screw threads, or by high-temperature adhesive, soldering or brazing, or by friction, such as by interference fit. Example metals of which the jacket 120 can be provided from include reinforced copper alloy and steel.

Upon reaching the target, the projectile collides against the target surface. By providing compressive pre-loading along the lateral surface, the jacket 120 enables the pellet 110 to maintain structural integrity during the penetration process upon striking the target.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An instrument for penetrating a target, said instrument being disposable in a projectile and comprising:

a substantially cylindrical shell having a cavity at a fore end, said shell having an interior annular surface that narrows towards aft;

a tip element disposable into said cavity, said element having an exterior conical surface that narrows towards aft, wherein said shell radially compresses said tip element along respective said interior and exterior surfaces that adjoin each other.

2. The instrument according to claim 1, wherein said shell further comprises an aft bore.

3. The instrument according to claim 1, wherein said element is a ceramic.

4. The instrument according to claim 1, wherein said element is composed of reactive materials.

* * * * *